(12) United States Patent
Hill et al.

(10) Patent No.: US 8,325,134 B2
(45) Date of Patent: *Dec. 4, 2012

(54) GESTURE RECOGNITION METHOD AND TOUCH SYSTEM INCORPORATING THE SAME

(75) Inventors: Douglas B. Hill, Calgary (CA); Gerald D. Morrison, Calgary (CA)

(73) Assignee: SMART Technologies ULC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/017,419

(22) Filed: Jan. 31, 2011

(65) Prior Publication Data

US 2011/0234638 A1    Sep. 29, 2011

Related U.S. Application Data

(63) Continuation of application No. 12/646,081, filed on Dec. 23, 2009, now Pat. No. 7,880,720, which is a continuation of application No. 12/189,579, filed on Aug. 11, 2008, now Pat. No. 7,643,006, which is a continuation of application No. 10/662,813, filed on Sep. 16, 2003, now Pat. No. 7,411,575.

(51) Int. Cl.
*G09G 5/00* (2006.01)

(52) U.S. Cl. .................................. 345/156; 345/173

(58) Field of Classification Search .................. 345/156, 345/157, 163, 173, 177; 341/22, 33, 34; 178/18.01–18.07, 19.01–19.05; 715/812, 715/773, 863–866

See application file for complete search history.

(56) References Cited

U.S. PATENT DOCUMENTS

| | | | |
|---|---|---|---|
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |
| 3,360,654 A | 12/1967 | Muller | |
| 3,478,220 A | 11/1969 | Milroy | |
| 3,613,066 A | 10/1971 | Cooreman | |
| 3,764,813 A | 10/1973 | Clement et al. | |
| 3,775,560 A | 11/1973 | Ebeling et al. | |
| 3,857,022 A | 12/1974 | Rebane et al. | |
| 3,860,754 A | 1/1975 | Johnson et al. | |
| 4,243,879 A | 1/1981 | Carroll et al. | |
| 4,420,261 A | 12/1983 | Barlow et al. | |
| 4,459,476 A | 7/1984 | Weissmueller et al. | |
| 4,468,694 A | 8/1984 | Edgar | |
| 4,550,250 A | 10/1985 | Mueller et al. | |

(Continued)

FOREIGN PATENT DOCUMENTS

AU    2003233728 A1    12/2003

(Continued)

OTHER PUBLICATIONS

Villamor, et al., Touch Gesture Reference Guide, Apr. 15, 2010.

(Continued)

*Primary Examiner* — Ricardo L Osorio
(74) *Attorney, Agent, or Firm* — Katten Muchin Rosenman LLP

(57) ABSTRACT

A gesture recognition method includes detecting multiple pointers in close proximity to a touch surface to determine if the multiple pointers are being used to perform a known gesture. When the multiple pointers are being used to perform a known gesture, executing a command associated with the gesture. A touch system incorporating the gesture recognition method is also provided.

37 Claims, 3 Drawing Sheets

U.S. PATENT DOCUMENTS

| | | |
|---|---|---|
| 4,553,842 A | 11/1985 | Griffin |
| 4,558,313 A | 12/1985 | Garwin et al. |
| 4,639,720 A | 1/1987 | Rympalski et al. |
| 4,672,364 A | 6/1987 | Lucas |
| 4,673,918 A | 6/1987 | Adler et al. |
| 4,703,316 A | 10/1987 | Sherbeck |
| 4,710,760 A | 12/1987 | Kasday |
| 4,746,770 A | 5/1988 | McAvinney |
| 4,766,424 A | 8/1988 | Adler et al. |
| 4,811,004 A | 3/1989 | Person et al. |
| 4,822,145 A | 4/1989 | Staelin |
| 4,851,664 A | 7/1989 | Rieger |
| 4,868,551 A | 9/1989 | Arditty et al. |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,990,901 A | 2/1991 | Beiswenger |
| 5,025,411 A | 6/1991 | Tallman et al. |
| 5,103,085 A | 4/1992 | Zimmerman |
| 5,105,186 A | 4/1992 | May |
| 5,148,015 A | 9/1992 | Dolan |
| 5,162,783 A | 11/1992 | Moreno |
| 5,164,714 A | 11/1992 | Wehrer |
| 5,179,369 A | 1/1993 | Person et al. |
| 5,196,836 A | 3/1993 | Williams |
| 5,239,152 A | 8/1993 | Caldwell et al. |
| 5,272,470 A | 12/1993 | Zetts |
| 5,359,155 A | 10/1994 | Helser |
| 5,422,494 A | 6/1995 | West et al. |
| 5,448,263 A | 9/1995 | Martin |
| 5,457,289 A | 10/1995 | Huang et al. |
| 5,484,966 A | 1/1996 | Segen |
| 5,528,263 A | 6/1996 | Platzker et al. |
| 5,554,828 A | 9/1996 | Primm |
| 5,591,945 A | 1/1997 | Kent |
| 5,698,845 A | 12/1997 | Kodama et al. |
| 5,729,704 A | 3/1998 | Stone et al. |
| 5,736,686 A | 4/1998 | Perret, Jr. et al. |
| 5,739,479 A | 4/1998 | Davis-Cannon |
| 5,745,116 A | 4/1998 | Pisutha-Arnond |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,793,361 A | 8/1998 | Kahn et al. |
| 5,804,773 A | 9/1998 | Wilson et al. |
| 5,818,424 A | 10/1998 | Korth |
| 5,819,201 A | 10/1998 | Degraaf |
| 5,825,352 A | 10/1998 | Bisset et al. |
| 5,854,491 A | 12/1998 | Pryor et al. |
| 5,909,210 A | 6/1999 | Knox et al. |
| 5,940,065 A | 8/1999 | Babb et al. |
| 5,990,874 A | 11/1999 | Tsumura |
| 6,043,805 A | 3/2000 | Hsieh |
| 6,076,041 A | 6/2000 | Watanabe |
| 6,091,406 A | 7/2000 | Kambara et al. |
| 6,104,387 A | 8/2000 | Chery et al. |
| 6,144,366 A | 11/2000 | Numazaki et al. |
| 6,215,477 B1 | 4/2001 | Morrison et al. |
| 6,222,175 B1 | 4/2001 | Krymski |
| 6,232,962 B1 | 5/2001 | Davis et al. |
| 6,320,597 B1 | 11/2001 | Ieperen |
| 6,326,954 B1 | 12/2001 | Van Ieperen |
| 6,346,966 B1 | 2/2002 | Toh |
| 6,352,351 B1 | 3/2002 | Ogasahara et al. |
| 6,362,468 B1 | 3/2002 | Murakami et al. |
| 6,377,228 B1 | 4/2002 | Jenkin et al. |
| 6,384,743 B1 | 5/2002 | Vanderheiden |
| 6,429,857 B1 | 8/2002 | Masters et al. |
| 6,480,187 B1 | 11/2002 | Sano et al. |
| 6,504,532 B1 | 1/2003 | Ogasahara et al. |
| 6,512,513 B2 | 1/2003 | Fleck et al. |
| 6,532,006 B1 | 3/2003 | Takekawa et al. |
| 6,540,366 B2 | 4/2003 | Keenan et al. |
| 6,540,679 B2 | 4/2003 | Slayton et al. |
| 6,570,103 B1 | 5/2003 | Saka et al. |
| 6,587,099 B2 | 7/2003 | Takekawa |
| 6,590,568 B1 | 7/2003 | Astala et al. |
| 6,597,508 B2 | 7/2003 | Seino et al. |
| 6,603,867 B1 | 8/2003 | Sugino et al. |
| 6,614,422 B1 | 9/2003 | Rafii et al. |
| 6,624,833 B1 | 9/2003 | Kumar et al. |
| 6,650,318 B1 | 11/2003 | Arnon |
| 6,654,001 B1 | 11/2003 | Su |
| 6,714,311 B2 | 3/2004 | Hashimoto |
| 6,720,949 B1 | 4/2004 | Pryor et al. |
| 6,738,051 B2 | 5/2004 | Boyd et al. |
| 6,760,009 B2 | 7/2004 | Omura |
| 6,778,207 B1 | 8/2004 | Lee et al. |
| 6,802,611 B2 | 10/2004 | Chu |
| 6,828,959 B2 | 12/2004 | Takekawa et al. |
| 6,829,372 B2 | 12/2004 | Fujioka |
| 6,927,384 B2 | 8/2005 | Reime et al. |
| 7,002,555 B1 | 2/2006 | Jacobsen et al. |
| 7,030,861 B1 | 4/2006 | Westerman et al. |
| 7,057,647 B1 | 6/2006 | Monroe |
| 7,058,204 B2 | 6/2006 | Hildreth et al. |
| 7,075,054 B2 | 7/2006 | Iwamoto et al. |
| 7,084,857 B2 | 8/2006 | Lieberman et al. |
| 7,084,859 B1 | 8/2006 | Pryor |
| 7,151,533 B2 | 12/2006 | Van Ieperen |
| 7,190,348 B2 | 3/2007 | Kennedy et al. |
| 7,193,608 B2 | 3/2007 | Stuerzlinger |
| 7,227,526 B2 | 6/2007 | Hildreth et al. |
| 7,236,162 B2 | 6/2007 | Morrison et al. |
| 7,237,937 B2 | 7/2007 | Kawashima et al. |
| 7,242,388 B2 | 7/2007 | Lieberman et al. |
| 7,265,748 B2 | 9/2007 | Ryynanen |
| 7,268,692 B1 | 9/2007 | Lieberman |
| 7,283,126 B2 | 10/2007 | Leung |
| 7,283,128 B2 | 10/2007 | Sato |
| 7,289,113 B2 | 10/2007 | Martin |
| 7,302,156 B1 | 11/2007 | Lieberman et al. |
| 7,305,368 B2 | 12/2007 | Lieberman et al. |
| 7,330,184 B2 | 2/2008 | Leung |
| 7,333,094 B2 | 2/2008 | Lieberman et al. |
| 7,333,095 B1 | 2/2008 | Lieberman et al. |
| 7,372,456 B2 | 5/2008 | McLintock |
| 7,375,720 B2 | 5/2008 | Tanaka |
| RE40,368 E | 6/2008 | Arnon |
| 7,411,575 B2 | 8/2008 | Hill et al. |
| 7,414,617 B2 | 8/2008 | Ogawa |
| 7,479,949 B2 | 1/2009 | Jobs et al. |
| 7,492,357 B2 | 2/2009 | Morrison et al. |
| 7,499,037 B2 | 3/2009 | Lube |
| 7,538,759 B2 | 5/2009 | Newton |
| 7,559,664 B1 | 7/2009 | Walleman et al. |
| 7,643,006 B2 | 1/2010 | Hill et al. |
| 2001/0030668 A1 | 10/2001 | Erten et al. |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0041327 A1 | 4/2002 | Hildreth et al. |
| 2002/0064382 A1 | 5/2002 | Hildreth et al. |
| 2002/0075243 A1 | 6/2002 | Newton |
| 2002/0118177 A1 | 8/2002 | Newton |
| 2002/0145595 A1 | 10/2002 | Satoh |
| 2003/0137494 A1 | 7/2003 | Tulbert |
| 2003/0156118 A1 | 8/2003 | Ayinde |
| 2003/0161524 A1 | 8/2003 | King |
| 2003/0210803 A1 | 11/2003 | Kaneda et al. |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0032401 A1 | 2/2004 | Nakazawa et al. |
| 2004/0051709 A1 | 3/2004 | Ogawa et al. |
| 2004/0071363 A1 | 4/2004 | Kouri et al. |
| 2004/0125086 A1 | 7/2004 | Hagermoser et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2005/0077452 A1 | 4/2005 | Morrison et al. |
| 2005/0104860 A1 | 5/2005 | McCreary et al. |

| | | | | | | |
|---|---|---|---|---|---|---|
| 2005/0128190 A1 | 6/2005 | Ryynanen | CN | 1440539 A | 9/2009 | |
| 2005/0156900 A1 | 7/2005 | Hill et al. | DE | 3836429 | 5/1990 | |
| 2005/0241929 A1 | 11/2005 | Auger et al. | DE | 60124549 | 9/2007 | |
| 2005/0243070 A1 | 11/2005 | Ung et al. | EP | 0125068 A2 | 11/1984 | |
| 2005/0248539 A1 | 11/2005 | Morrison et al. | EP | 0420335 | 4/1991 | |
| 2005/0248540 A1 | 11/2005 | Newton | EP | 0897161 A1 | 2/1999 | |
| 2005/0270781 A1 | 12/2005 | Marks | EP | 0911721 A2 | 4/1999 | |
| 2006/0012579 A1 | 1/2006 | Sato | EP | 1059605 A2 | 12/2000 | |
| 2006/0022962 A1 | 2/2006 | Morrison et al. | EP | 1262909 A2 | 12/2002 | |
| 2006/0028456 A1 | 2/2006 | Kang | EP | 1739528 A1 | 1/2003 | |
| 2006/0034486 A1 | 2/2006 | Morrison et al. | EP | 1739529 A1 | 1/2003 | |
| 2006/0152500 A1 | 7/2006 | Weng | EP | 1420335 A2 | 5/2004 | |
| 2006/0170658 A1 | 8/2006 | Nakamura et al. | EP | 1457870 A2 | 9/2004 | |
| 2006/0192799 A1 | 8/2006 | Vega et al. | EP | 1471459 A2 | 10/2004 | |
| 2006/0197749 A1 | 9/2006 | Popovich | EP | 1517228 A2 | 3/2005 | |
| 2006/0244734 A1* | 11/2006 | Hill et al. ........................ 345/173 | EP | 1550940 A2 | 6/2005 | |
| 2006/0279558 A1 | 12/2006 | Van Delden et al. | EP | 1611503 | 1/2006 | |
| 2007/0002028 A1 | 1/2007 | Morrison et al. | EP | 1674977 | 6/2006 | |
| 2007/0019103 A1 | 1/2007 | Lieberman et al. | EP | 1741186 | 1/2007 | |
| 2007/0089915 A1 | 4/2007 | Ogawa et al. | EP | 1766501 | 3/2007 | |
| 2007/0152984 A1 | 7/2007 | Ording et al. | EP | 1830248 A1 | 9/2007 | |
| 2007/0152986 A1 | 7/2007 | Ogawa et al. | EP | 1877893 | 1/2008 | |
| 2007/0165007 A1 | 7/2007 | Morrison et al. | ES | 2 279 823 T3 | 9/2007 | |
| 2007/0167709 A1 | 7/2007 | Slayton | GB | 1575420 | 9/1980 | |
| 2007/0205994 A1 | 9/2007 | van Ieperen | GB | 2 176 282 A | 5/1986 | |
| 2007/0269107 A1 | 11/2007 | Iwai et al. | GB | 2 263 765 A | 8/1993 | |
| 2007/0273842 A1 | 11/2007 | Morrison | JP | 62-005428 | 1/1987 | |
| 2007/0290996 A1 | 12/2007 | Ting | JP | 63-223819 | 9/1988 | |
| 2007/0291125 A1 | 12/2007 | Marquet | JP | 03-244017 | 10/1991 | |
| 2008/0029691 A1 | 2/2008 | Han | JP | 06-110608 | 4/1994 | |
| 2008/0042999 A1 | 2/2008 | Martin | JP | 09-146708 A | 6/1997 | |
| 2008/0055262 A1 | 3/2008 | Wu et al. | JP | 10-105324 A | 4/1998 | |
| 2008/0055267 A1 | 3/2008 | Wu et al. | JP | 10-222646 A | 8/1998 | |
| 2008/0062140 A1 | 3/2008 | Hotelling et al. | JP | 11-203042 | 7/1999 | |
| 2008/0068352 A1 | 3/2008 | Worthington et al. | JP | 11-212692 | 8/1999 | |
| 2008/0083602 A1 | 4/2008 | Auger et al. | JP | 2000-163193 A | 6/2000 | |
| 2008/0106706 A1 | 5/2008 | Holmgren et al. | JP | 2001-142642 | 5/2001 | |
| 2008/0122803 A1 | 5/2008 | Izadi et al. | JP | 2001-282456 A | 10/2001 | |
| 2008/0259050 A1 | 10/2008 | Lin et al. | JP | 2002-055770 | 2/2002 | |
| 2008/0259052 A1 | 10/2008 | Lin et al. | JP | 2003-65716 A | 3/2003 | |
| 2009/0058832 A1 | 3/2009 | Newton | JP | 2003-167669 A | 6/2003 | |
| 2009/0058833 A1 | 3/2009 | Newton | JP | 2003-167759 A | 6/2003 | |
| 2009/0109194 A1 | 4/2009 | Weng | JP | 2003-173237 A | 6/2003 | |
| 2009/0146972 A1 | 6/2009 | Morrison et al. | JP | 2005-108211 A | 4/2005 | |
| 2009/0303187 A1 | 12/2009 | Pallakoff | JP | 2005-182423 A | 7/2005 | |
| 2010/0182277 A1 | 7/2010 | Nakajima et al. | JP | 2005-202950 A | 7/2005 | |
| 2011/0234638 A1* | 9/2011 | Hill et al. ........................ 345/661 | WO | 98/07112 A2 | 2/1998 | |
| | | | WO | 01/24157 A1 | 4/2001 | |
| FOREIGN PATENT DOCUMENTS | | | WO | 01/31570 A2 | 5/2001 | |
| AU | 2006243730 A1 | 11/2006 | WO | 01/63550 A2 | 8/2001 | |
| CA | 2058219 A1 | 4/1993 | WO | 01/69365 A1 | 9/2001 | |
| CA | 2367864 A1 | 4/1993 | WO | 01/91043 A2 | 11/2001 | |
| CA | 2219886 A1 | 4/1999 | WO | 02/03316 A1 | 1/2002 | |
| CA | 2251221 A1 | 4/1999 | WO | 02/08881 A2 | 1/2002 | |
| CA | 2267733 A1 | 10/1999 | WO | 03/054681 A1 | 7/2003 | |
| CA | 2268208 A1 | 10/1999 | WO | 03/104887 A2 | 12/2003 | |
| CA | 2252302 A1 | 4/2000 | WO | 2004/072843 A1 | 8/2004 | |
| CA | 2350152 A1 | 6/2001 | WO | 2004/090706 A2 | 10/2004 | |
| CA | 2341918 A1 | 9/2002 | WO | 2004/102523 A1 | 11/2004 | |
| CA | 2386094 A1 | 12/2002 | WO | 2004/104810 A1 | 12/2004 | |
| CA | 2372868 A1 | 8/2003 | WO | 2005/031554 A1 | 4/2005 | |
| CA | 2390503 A1 | 12/2003 | WO | 2005034027 A1 | 4/2005 | |
| CA | 2390506 A1 | 12/2003 | WO | 2005/107072 A1 | 11/2005 | |
| CA | 2432770 A1 | 12/2003 | WO | 2006/002544 A1 | 1/2006 | |
| CA | 2448603 A1 | 5/2004 | WO | 2006/092058 A1 | 9/2006 | |
| CA | 2453873 A1 | 7/2004 | WO | 2006/095320 A2 | 9/2006 | |
| CA | 2460449 A1 | 9/2004 | WO | 2006/096962 A1 | 9/2006 | |
| CA | 2521418 A1 | 10/2004 | WO | 2006/116869 A1 | 11/2006 | |
| CA | 2481396 A1 | 3/2005 | WO | 2007/019600 A1 | 2/2007 | |
| CA | 2491582 A1 | 7/2005 | WO | 2007/037809 | 4/2007 | |
| CA | 2563566 A1 | 11/2005 | WO | 2007/079590 | 7/2007 | |
| CA | 2564262 A1 | 11/2005 | WO | 2007/132033 A1 | 11/2007 | |
| CA | 2501214 A1 | 9/2006 | WO | 2007/134456 A1 | 11/2007 | |
| CA | 2606863 A1 | 11/2006 | WO | 2008/128096 A2 | 10/2008 | |
| CA | 2580046 A1 | 9/2007 | WO | 2009/029764 A1 | 3/2009 | |
| CN | 1310126 C | 8/2001 | WO | 2009/029767 A1 | 3/2009 | |
| CN | 1784649 A | 6/2006 | WO | 2009/146544 A1 | 12/2009 | |
| CN | 101019096 A | 8/2007 | WO | 2010/051633 A1 | 5/2010 | |
| CN | 101023582 A | 8/2007 | WO | 2010/0512633 A1 | 5/2010 | |

OTHER PUBLICATIONS

European Search Report for European Patent Application No. 10 01 3921 with a date of completion of the search of Jan. 21, 2011.
Office Action for Canadian Patent Application No. 2,481,396 with a mailing date of Dec. 3, 2009.
Office Action for European Patent Application No. 10 01 3921.1 with a date of completion of the search of Sep. 27, 2011.
English translation of the Jul. 18, 2007 Rejection Notice for Japanese Patent Application No. 2004-269153.
English translation of the Feb. 20, 2008 Rejection Notice for Japanese Patent Application No. 2004-269153.
English translation of the Dec. 14, 2010 Rejection Notice for Japanese Patent Application No. 2004-269153.
English translation of the Aug. 2, 2011 Rejection Notice for Japanese Patent Application No. 2004-269153.
English translation of the Jun. 14, 2011 Rejection Notice for Japanese Patent Application No. 2009-023841.
English translation of the Jun. 14, 2011 Rejection Notice for Japanese Patent Application No. 2009-023842.
International Preliminary Report on Patentability, PCT/NZ2004/000029, May 20, 2005 (21 pages).
"International Preliminary Report on Patentability", PCT/US2008/060102, Oct. 22, 2009 (9 pages).
International Search Report for PCT/CA2010/001085 mailed Oct. 12, 2010 (5 pages).
"International Application Serial No. PCT/US2008/060102, Search Report & Written opinion mailed Feb. 12, 2009" (14 pages).
International Application Serial No. PCT/US2008/074749, Search Report & Written Opinion mailed Feb. 11, 2009 (10 pages).
"International Application Serial No. PCT/US2008/074755, International Search Report and Written Opinion mailed Jan. 29, 2009" (14 pages).
International Search Report for PCT/NZ05/00092 Sep. 27, 2006 (4 pages).
Loinaz et al., "A 200-mW, 3.3-V, CMOS Color Camera IC Producing 352x288 24-B Video at 30 Frames/s," IEEE Journal of Solid-StateCircuits,vol. 31,No. 12,Dec. 1998, pp. 2092-2103.
Yawcheng Lo, "Solid-state image sensor: technologies and applications," Input/Output and Imaging Technologies, Y.T. Tsai, T-M. Kung, and J. Larsen, eds. SPIE Proceedings vol. 3422, pp. 70-80 (1998).
*Touch Panel*, vol. 5 No. 2-3 (Sep. 2010).
*Touch Panel*, vol. 5 No. 4 (Nov. 2010).
"Store Window Presentations", Heddier Electronic.
"ThruGlass", Projected Capacitive Touchscreencs Specifications, Micro Touch.
Benko, et al., "Precise Selection Techniques for Multi-Touch Screens", Proc. ACM CHI 2006: Human Factors in Computer Systems, pp. 1263-1272.
Buxton, W., "Issues and Techniques in Touch-Sensitive Tablet Input," Computer Graphics, 19(3), Proceedings of SIGGRAPH '85, 1985, pp. 215-223.
VGA-format CMOS Camera-on-a-Chip for Multimedia Applications, Photobit Corporation, 1999 (2 pages).
"White Paper", Digital Vision Touch Technology Feb. 2003.
Decision of Rejection Translation of Japanese Patent Application No. 2002-507309, date of Decision: Aug. 18, 2011, 9 pages.

* cited by examiner

GESTURE RECOGNITION METHOD AND TOUCH SYSTEM INCORPORATING THE SAME

This application is a continuation of U.S. patent application Ser. No. 12/646,081, filed Dec. 23, 2009, now U.S. Pat. No. 7,880,720, issued Feb. 1, 2011, which is a continuation of U.S. patent application Ser. No. 12/189,579, filed Aug. 11, 2008, now U.S. Pat. No. 7,643,006, issued Jan. 5, 2010, which is a continuation of U.S. patent application Ser. No. 10/662,813, filed Sep. 16, 2003, now U.S. Pat. No. 7,411,575, issued Aug. 12, 2008, the contents of all incorporated herein by reference.

FIELD OF THE INVENTION

The present invention relates generally to touch systems and in particular to a gesture recognition method and touch system incorporating the same.

BACKGROUND OF THE INVENTION

Touch systems are well known in the art and typically include a touch screen having a touch surface on which contacts are made using a pointer in order to generate user input. Pointer contacts with the touch surface are detected and are used to generate corresponding output depending on areas of the contact surface where the contacts are made. There are basically two general types of touch systems available and they can be broadly classified as "active" touch systems and "passive" touch systems.

Active touch systems allow a user to generate user input by contacting the touch surface with a special pointer that usually requires some form of on-board power source, typically batteries. The special pointer emits signals such as infrared light, visible light, ultrasonic frequencies, electromagnetic frequencies, etc. that activate the touch surface.

Passive touch systems allow a user to generate user input by contacting the touch surface with a passive pointer and do not require the use of a special pointer in order to activate the touch surface. The pointer can be a finger, a cylinder of some material, or any suitable object that can be used to contact some predetermined area of interest on the touch surface.

Passive touch systems provide advantages over active touch systems in that any suitable pointing device, including a user's finger, can be used as a pointer to contact the touch surface. As a result, user input can easily be generated. Also, since special active pointers are not necessary in passive touch systems, battery power levels and/or pointer damage, theft, or misplacement are of no concern to users.

For example, U.S. patent application Ser. No. 09/610,481 filed on Jul. 5, 2000 and International PCT Application No. PCT/CA01/00980 filed on Jul. 5, 2001 and published under No. WO 02/03316 on Jan. 10, 2002, assigned to SMART Technologies Inc., assignee of the present invention, disclose a camera-based touch system comprising a touch screen that includes a passive touch surface on which a computer-generated image is presented. A rectangular bezel or frame surrounds the touch surface and supports digital cameras at its corners. The digital cameras have overlapping fields of view that encompass and look across the touch surface. The digital cameras acquire images looking across the touch surface from different locations and generate image data. Image data acquired by the digital cameras is processed by digital signal processors associated with the digital cameras to determine if a pointer exists in the captured image data. When it is determined that a pointer exists in the captured image data, the digital signal processors generate pointer information packets (PIPs) and convey the PIPs to a master controller. Each PIP includes a header portion, a data portion and a checksum. The data portion includes a pointer ID field that stores a pointer identifier to allow multiple pointers to be tracked. The data portion also includes a pointer location parameter that identifies a pointer x-position and a pointer tip parameter that identifies a pointer z-position. A contact state field stores a value indicating whether the pointer is in or out of contact with the touch surface allowing pointer hover to be detected.

Upon receipt of the PIPs, the master controller processes the PIPs using triangulation to determine the location of each pointer in the captured images relative to the touch surface in (x,y) coordinates. In this manner, as PIPs are generated in response to captured images, the position and movement of pointers over the touch surface can be tracked. The pointer location data generated by the master controller is conveyed to a computer executing one or more application programs. The computer uses the pointer location data to update the computer-generated image that is presented on the touch surface. Pointer contacts on and pointer movement over the touch surface can therefore be recorded as writing or drawing or used to control execution of application programs executed by the computer.

As will be appreciated, since digital cameras at the corners of the bezels are used to capture image data, the touch system is able to determine when multiple pointers contact and move across the touch surface. This of course provides for enhanced functionality as compared to analog resistive touch systems that are only able to track a single pointer. Although enhanced functionality is provided by the above-described camera-based touch system, to-date, this enhanced functionally has not been fully exploited. It is therefore an object of the present invention to provide a novel gesture recognition method and touch system incorporating the same.

SUMMARY OF THE INVENTION

According to one aspect of the present invention there is provided a gesture recognition method comprising the steps of:

displaying an image on a touch surface;

detecting pointer contacts on said touch surface and examining said pointer contacts to recognize multiple pointer contacts representing a gesture; and when multiple pointer contacts representing a gesture occur, updating the displayed image in accordance with said gesture.

Multiple pointer contacts representing a gesture include multiple finger contacts on the touch surface, a finger contact on the touch surface and an object contact on the touch surface and multiple object contacts on the touch surface.

In one aspect, the gesture is a right-click event and is represented by a first pointer contact on a displayed application, and a subsequent second pointer contact that occurs within a threshold distance of the first pointer contact and while the first pointer contact is maintained. In another aspect, the gesture is a scroll event and is represented by simultaneous pointer contacts on the touch surface.

According to another aspect of the present invention there is provided a gesture recognition method comprising the steps of:

detecting multiple pointers in close proximity to a touch surface to determine if said multiple pointers are being used to perform a known gesture; and when said multiple pointers are being used to perform a known gesture, executing a command associated with said gesture.

Preferably, during the detecting, pointer contacts with or close pointer hovers over the touch surface are detected to determine if a known gesture is being performed and specifically if one of a number of known gestures is being performed, each known gesture being associated with a different command. In a preferred embodiment, the movement of the multiple pointers relative to the touch surface and/or the pointer type determines the gesture being performed.

According to yet another aspect of the present invention there is provided an input detection method in an interactive system capable of detecting movement of multiple pointers generally simultaneously within an input region, said method comprising the steps of:

capturing images looking generally across said input region;

analyzing said images to detect multiple pointers within said input region;

when multiple pointers are detected, examining data associated with said multiple pointers to determine if the data represents an input gesture; and when the data represents an input gesture, executing a command corresponding to the recognized input gesture.

According to still yet another aspect of the present invention there is provided a touch system comprising:

a touch surface to be contacted by at least one pointer;

at least one imaging device having a field of view looking generally across said touch surface; and at least one processor communicating with said at least one imaging device and analyzing images acquired by said at least one imaging device to determine the location on said touch surface where pointer contacts are made, when said touch surface is contacted by multiple pointers, said processor examining said multiple pointer contacts to determine if said multiple pointer contacts represent a gesture and when said multiple pointer contacts represent a gesture, said processor executing a command associated with said gesture.

According to still yet another aspect of the present invention there is provided an interactive input system comprising:

at least one imaging device having an input region within its field of view into which one or more pointers is moved to generate user input; and at least one processor communicating with said at least one imaging device and analyzing each image acquired by said at least one imaging device to determine the action of pointers in said input region, said at least one processor determining when multiple pointer actions within said input region represent a gesture, when said multiple pointer actions represent a gesture, said at least one processor executing a command corresponding to said gesture.

According to still yet another aspect of the present invention there is provided in an interactive touch system, a method of simulating a right-click mouse event comprising the steps of:

detecting a first pointer contact on a touch surface over a displayed application that represents a left-click mouse event;

detecting a second pointer contact on said touch surface that occurs within a threshold period of time following said first pointer contact and within a threshold distance of said first pointer contact; and generating a right-click mouse event in response to said detected second pointer contact.

The present invention provides advantages in that since gestures represented by multiple pointer contacts on and/or movement over the touch surface are detected and corresponding commands generated, enhanced touch system functionality is provided.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
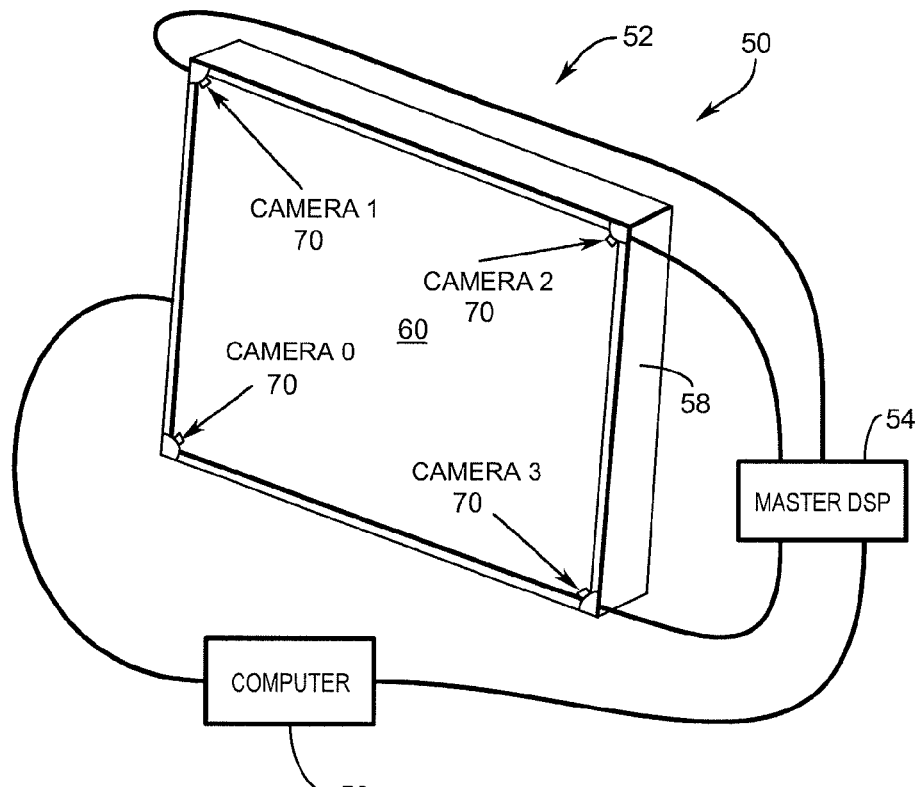
FIG. 1 is a schematic diagram of a camera-based touch system in accordance with the present invention.

Turning now to FIG. 1, a camera-based touch system in accordance with the present invention is shown and is generally identified by reference numeral 50. Camera-based touch system 50 is similar to that disclosed in International PCT Application Serial No. WO 02/03316, assigned to SMART Technologies Inc., assignee of the present invention, the contents of which are incorporated herein by reference. As can be seen, touch system 50 includes a touch screen 52 coupled to a digital signal processor (DSP) based master controller 54. Master controller 54 is also coupled to a computer 56. Computer 56 executes one or more application programs and provides computer-generated image output that is displayed on the touch screen 52. The coordinate system of the touch system 52 is mapped to the coordinate system of the computer. The touch screen 52, master controller 54 and computer 56 form a closed-loop so that pointer hover or contacts with and pointer movement over or above the touch screen 52 can be recorded as writing or drawing or used to control execution of application programs executed by the computer 56.

Figure 2:
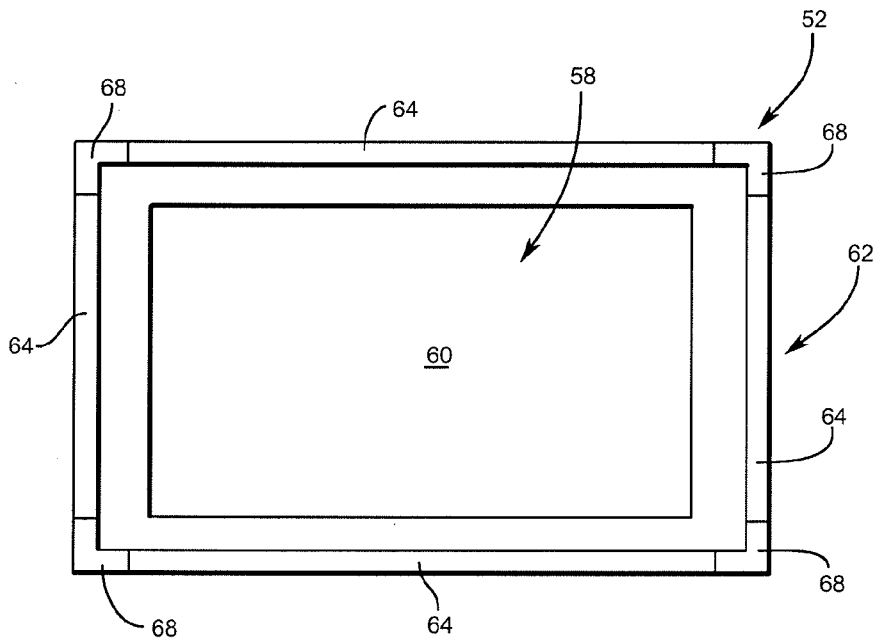
FIG. 2 is a front elevation view of a touch screen forming part of the touch system of FIG. 1.
Figures 3A, 3B:
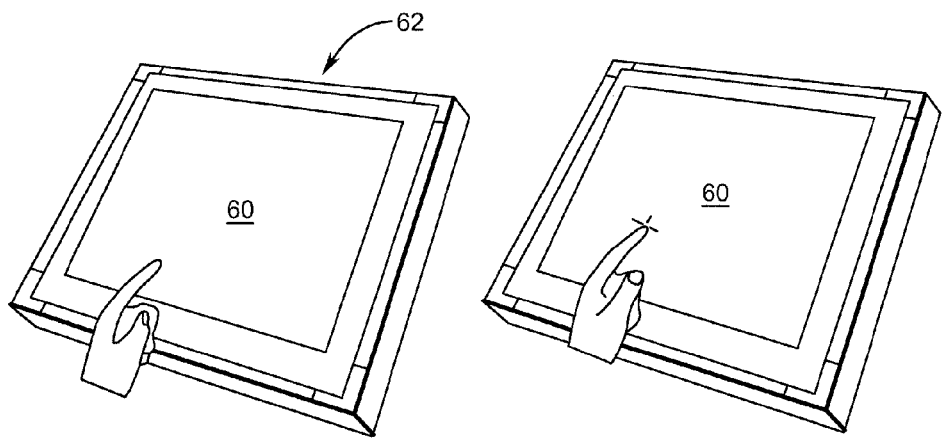
FIGS. 3a to 3d are front perspective views of the touch screen of FIG. 2 showing an input right-click gesture.
Figures 3C, 3D:
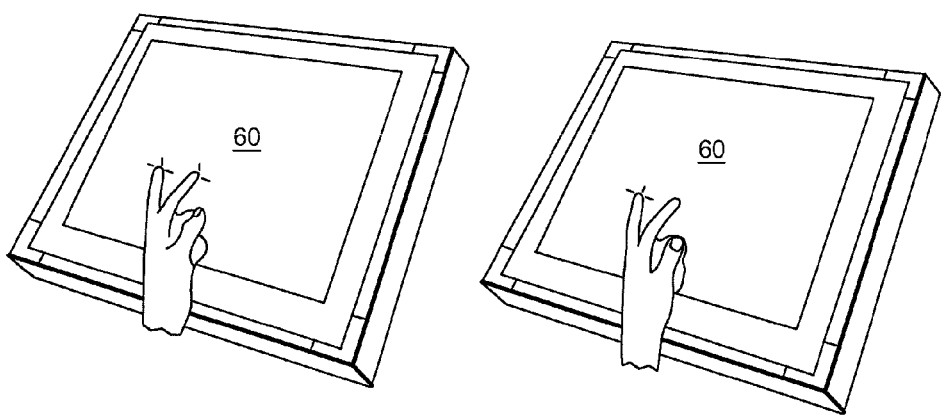
Figure 4A:
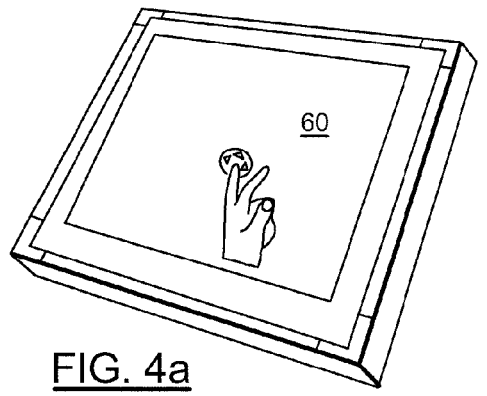
FIGS. 4a to 4f are front perspective views of the touch screen of FIG. 2 showing input up/down and left/right scroll gestures.
Figure 4B:
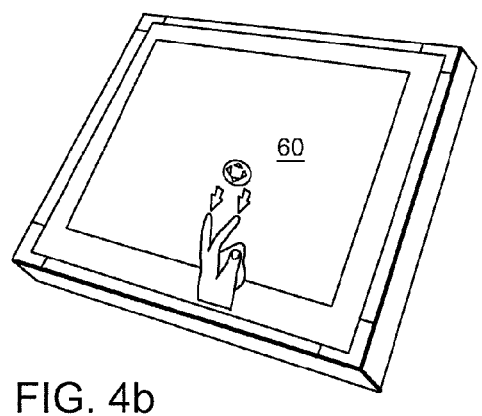
Figure 4C:
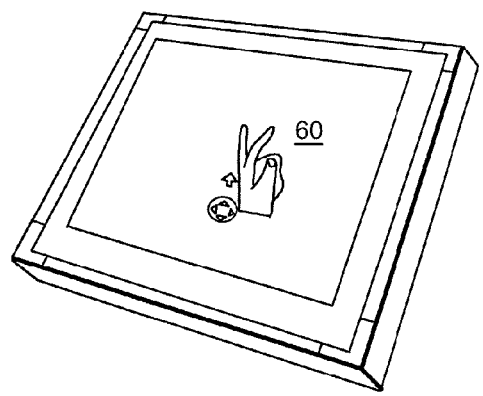
Figure 4D:
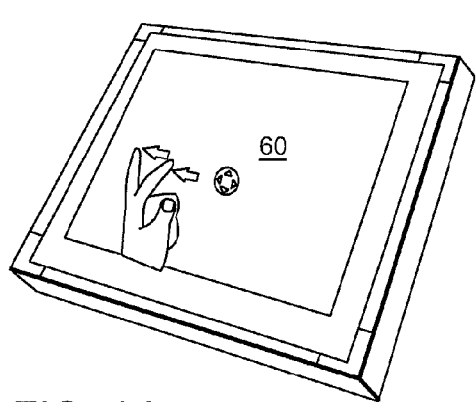
Figure 4E:
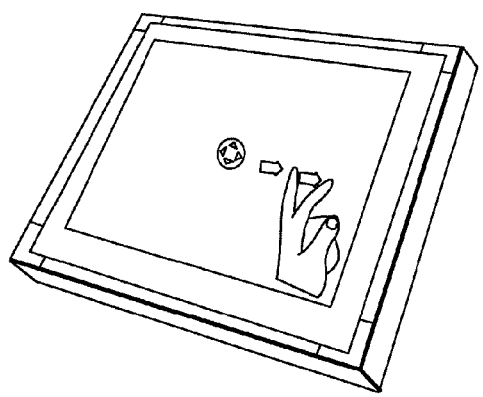
Figure 4F:
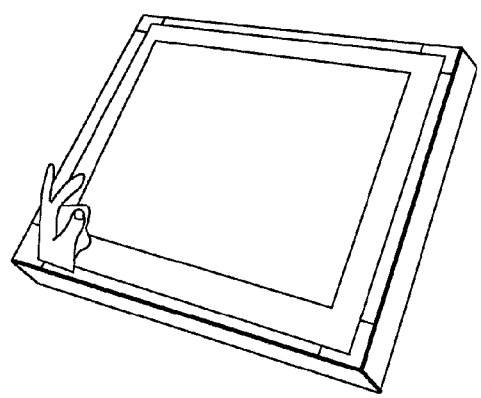

FIG. 2 better illustrates the touch screen 52. Touch screen 52 in the present embodiment includes a high-resolution display device such as a plasma display 58, the front surface of which defines a touch surface 60. The touch surface 60 is bordered by an illuminated bezel or frame 62 coupled to the display device. Illuminated bezel 62 is of the type disclosed in U.S. patent application Ser. No. 10/354,168 filed on Jan. 30, 2003 and includes elongate side frame assemblies 64 that are coupled to the sides of the plasma display 58. Each side frame assembly 64 accommodates a light source (not shown) that projects infrared backlighting across the touch surface 60. The ends of the side frame assemblies 64 are joined by corner pieces 68 that house DSP-based CMOS digital cameras 70. Each digital camera 70 is mounted within its respective corner piece 68 so that its field of view encompasses and looks across the entire touch surface 60.

During operation, the digital cameras 70 acquire images of the touch surface 60 and generate image data. The acquired image data is processed by digital signal processors associated with the digital cameras 70 to determine if a pointer exists in the captured images. When it is determined that one or more pointers exist in the acquired image data, the digital signal processors of the digital cameras 70 generate pointer information packets (PIPs) and convey the PIPs to the digital signal processor (DSP) based master controller 54. Each PIP includes a header portion, a data portion and a checksum. The data portion includes a pointer ID field that stores a pointer identifier to allow multiple pointers to be tracked. The data portion also includes a pointer location parameter that identifies a pointer x-position and a pointer tip parameter that identifies a pointer z-position. A contact state field stores a value indicating whether the pointer is in or out of contact with the touch surface 60 allowing pointer hover to be detected.

Upon receipt of the PIPs, the master controller 54 processes the PIPs using triangulation to determine the location of each pointer in the captured images relative to the touch surface 60 in (x,y) coordinates. In this manner, as PIPs are generated in response to captured images, the position and movement of pointers over the touch surface 60 can be tracked. Since image data is processed to detect the existence of one or more pointers, the pointers may take any suitable form such as for example, a user's finger, a cylinder of material, a passive or active pen tool or erase tool or other appropriate object. Specifics of the manner by which the image data is acquired by the digital cameras 70 and processed by the master controller 54 are described in International PCT Application No. PCT/CA01/00980 filed on Jul. 5, 2001 and published under No. WO 02/03316 on Jan. 10, 2002, the contents of which are incorporated herein by reference. Accordingly, such specifics will not be described further herein.

The master controller 54 outputs generated pointer data to the computer 56 that identifies the location of each pointer relative to the touch surface as each pointer approaches and/or contacts and moves over the touch surface 60. A driver loaded on the computer 56 receives the pointer data and examines the pointer data to determine if the pointer data has been generated in response to a known input gesture stored in a gesture library. Specifically, the driver examines the pointer data to detect the existence of multiple pointers in captured images and then examines the nature of the multiple pointers to determine if a known gesture has been performed such as for example a right-click gesture, a scroll gesture, a rotate gesture etc. When a gesture has been performed, the driver generates a command (event) that is associated with the determined gesture and conveys the command to the active application program being executed by the computer 56.

Turning now to FIGS. 3a to 4f, examples of gestures that can be recognized by the touch system and the resulting actions that are performed in response to the recognized gestures are shown.

Intuitive Right-Click Gesture

FIGS. 3a to 3d illustrate an intuitive right-click gesture. When a user contacts the touch surface 60 with a finger over an application displayed on the touch surface, the driver recognizes the contact as a left-click mouse event and injects the left-click mouse event into the application. If the user subsequently contacts the touch surface 60 with another finger while maintaining the contact with the one finger and the subsequent contact is to the right of and close to the initial contact, the driver recognizes the second touch surface contact as a right-click gesture and injects a right-click event into the application. In response to the right-click event, the application opens and displays a drop down menu (not shown). As will be appreciated, this enables a user to invoke a right-click action using a hand gesture that is similar to the action performed when invoking a right-click action using a mouse. Although, FIGS. 3a to 3d show the intuitive right-click gesture being performed using two fingers on the same hand, it will be appreciated that the right-click gesture can be performed using a finger on different hands.

Scroll Up/Down and Left/Right Gesture

FIGS. 4a to 4e illustrate up/down and left/right scroll gestures. If the user contacts the touch surface 60 with a pair of fingers simultaneously over an application window displayed on the touch surface and the fingers are closely and generally horizontally spaced, the driver recognizes the simultaneous finger contacts as a scroll gesture and injects a scroll event into the application. Pointer position data conveyed to the application by the driver in response to subsequent vertical movement of the fingers is interpreted by the application either as scroll up or scroll down commands. In response to the scroll up or down commands, the application moves information presented within the application window in the direction of the vertical movement. Pointer position data conveyed to the application by the driver in response to subsequent horizontal movement of the fingers is interpreted by the application as scroll to side commands. In response to the scroll to side commands, the application moves information displayed within the application window to the side corresponding to the direction of the horizontal movement. Although FIGS. 4a to 4f show the scroll gestures being performed using two fingers on the same hand, it will be appreciated that the scroll gestures can be performed using a finger on different hands.

Although not illustrated, a number of other gestures can be recognized by the driver and used to generate commands to control an application being executed by the computer 56. Examples of such other gestures will now be described.

Page Up/Down Gesture

If the user contacts the touch surface 60 with three fingers simultaneously over an application window displayed on the touch surface and the three fingers are closely and generally horizontally spaced, the driver recognizes the simultaneous finger contacts as a page gesture and injects a page event into the application. Pointer position data conveyed to the application by the driver in response to subsequent vertical movement of the fingers is interpreted by the application as page up or page down commands depending on the direction of the vertical movement. In response to the page up or page down commands, the application moves information displayed within the window in the appropriate direction.

Rotate Gesture

If the user contacts the touch surface 60 over an object displayed within an application window with one finger and then subsequently contacts the touch surface with another finger and moves that other finger in an arc while maintaining the touch surface contact with the one finger, the driver recognizes the arcuate movement of the second finger as a rotate gesture. The driver in turn injects a rotate command into the application causing the application to rotate the object about the contact point defined by the first finger in the direction of the arc and by an amount equivalent to the path of the arc.

Zoom Gesture

If the user contacts the touch surface 60 with a pair of closely spaced fingers simultaneously over an application window and expands the distance between the fingers in a generally horizontal direction, the driver recognizes the finger movement as a zoom-out gesture. The driver in turn injects a zoom-out command into the application causing the application to expand the size of the information presented in the application window. If the user contacts the touch surface 60 with a pair of spaced fingers simultaneously over an application window and moves the fingers in a generally horizontal direction towards one another, the driver recognizes the finger movement as a zoom-in gesture. The driver in turn injects a zoom-in command into the application causing the application to reduce the size of the information presented in the application window.

Alternatively, the zoom-out and zoom-in commands may be represented by other gestures. For example, if the user contacts the touch surface 60 with a clawed hand having its fingers bunched together over an application window and expands the hand by extending the fingers outwardly, the driver recognizes the finger movement as the zoom-out gesture.

If the user contacts the touch surface 60 with a generally flat hand having its fingers extended over an application window and contracts the hand by clawing the fingers inwardly to bunch them together, the driver recognizes the finger movement as the zoom-in gesture.

Expand Gesture

If the user contacts the touch surface 60 with a pair of closely spaced fingers simultaneously over an application window and expands the distance between the fingers in a generally diagonal direction, the driver recognizes the finger movement as an increase window size gesture. The driver in turn injects an increase window size command into the application causing the application to expand the size of the application window. If the user contacts the touch surface 60 with a pair of spaced fingers simultaneously over an application window and moves the fingers in a generally diagonal direction towards one another, the driver recognizes the finger movement as a decrease window size gesture. The driver in turn injects a decrease window size command into the application causing the application to reduce the size of the application window.

Icon Select and Open Gesture

If the user contacts the touch surface 60 with two closely spaced fingers simultaneously over an icon, the driver recognizes the finger contact as a double-click gesture. The driver in turn generates an open application command causing the desktop application running on the computer 56 to open the selected application.

Object/Window Move Gesture

If the user moves a pair of closely spaced fingers above the touch surface 60 and over an object displayed within an application window, the driver recognizes the hovering finger movement as a translate object gesture. The driver in turn injects a translate object command into the application causing the application to translate the displayed object in the direction of and by an amount equal to the distance the fingers are moved.

If the user moves three closely spaced fingers above the touch surface 60 and over an application window, the driver recognizes the hovering finger movement as a translate window gesture. The driver in turn generates a translate window command causing the desktop application running on the computer 56 to translate the application window in the direction of and by an amount equal to the distance the fingers are moved.

Although the above gestures are described as being recognized in response to multiple finger contacts or hovers, the same gestures can be recognized if other objects are used to perform the gestures. For example, multiple pen tools can be used to perform the gestures or alternatively a finger and a pen tool can be used to perform the gestures.

Also, recognized gestures may be enhanced using different pointer characteristics. For example, in the case of scroll gestures, the angle at which the pointers contact the touch surface 60 may be used to determine the rate at which the displayed information is scrolled. Pointers contacting the touch surface 60 at a steep angle may represent a slow scroll rate whereas pointers contacting the touch surface 60 at a shallow angle may represent a fast scroll rate.

If the touch system is able to differentiate between the type of pointers used to contact the touch surface 60 as is described in co-pending U.S. patent application Ser. No. 10/384,783 filed on Mar. 11, 2003 and/or is able to determine pointer characteristics as is described in co-pending U.S. patent application Ser. No. 10/294,917, filed on Nov. 15, 2002, the contents of which are incorporated herein by reference, different functionality can be assigned to similar gestures that are performed using different pointers. For example, in the case of the rotate gesture described above, if the same gesture is carried out using a finger to initially contact an object within the application window and a pen tool to describe the arc, the driver recognizes the finger contact and pen movement as a pattern fill gesture rather than a rotate gesture. A finger contact and subsequent closely spaced pen tool contact may represent a draw circle gesture rather than a scroll gesture and a finger contact and subsequent closely spaced eraser contact may represent an erase page gesture. As will be appreciated, being able to differentiate between multiple pointers brought into proximity with the touch surface 60 significantly increases the functions that may be invoked by performing the same gestures simply by using discrete pointers that can be differentiated.

Although the driver is described as examining the pointer data to determine if the pointer data is generated in response to a known gesture, it will be appreciated by those of skill in the art that if the active application being executed by the computer has the capability of recognizing gestures, the pointer data may be conveyed to the active application for gesture recognition.

If desired the touch surface 60 may be partitioned into multiple regions to enable multiple users to interact with the touch surface simultaneously without ambiguity between user input. In this case multiple contacts on or hovers over the touch surface that are beyond a threshold distance are treated as multiple user inputs. Multiple contacts on or hovers over the touch surface that are within the threshold distance are treated as multiple contacts made by a single user and are examined to determine if the multiple contacts represent a gesture.

Although preferred embodiments of the present invention have been described, those of skill in the art will appreciate that variations and modifications may be made without departing from the spirit and scope thereof as defined by the appended claims.

What is claimed is:

1. An event generation method comprising:
   detecting multiple pointers brought into contact with a touch surface, the subsequent relative movement of said pointers along said touch surface and the pointer types; and
   generating an event based on the subsequent relative movement of said pointers along said touch surface and the pointer types.

2. The method of claim 1 wherein said detecting comprises capturing images of the touch surface from different vantages using imaging devices that are aimed to look generally across the touch surface and processing the captured images to detect the subsequent relative movement of said pointers and the pointer types.

3. The method of claim 2 wherein during said processing, the captured images are processed to detect movement of multiple pointers away from one another.

4. The method of claim 2 wherein during said processing, the captured images are processed to detect movement of multiple pointers towards one another.

5. The method of claim 1 wherein the event is a graphical object manipulation command.

6. The method of claim 5 wherein the graphical object manipulation command is one of a graphical object resize command, a graphical object rotate command and a graphical object translate command.

7. The method of claim 5 further comprising executing said graphical object manipulation command.

8. The method of claim 7 wherein during said processing, the captured images are processed to detect movement of multiple pointers away from one another.

9. The method of claim 7 wherein during said processing, the captured images are processed to detect movement of multiple pointers towards one another.

10. The method of claim 7 wherein during said processing, the captured images are processed to detect movement of one pointer in a generally arcuate path about another pointer.

11. The method of claim 1 wherein during said processing, the captured images are processed to detect movement of one pointer in a generally arcuate path about another pointer.

12. An interactive input system comprising:
at least one imaging device aimed to look generally across a touch surface; and
processing structure processing image data captured by said at least one imaging device and being configured to:
detect multiple pointers brought into contact with said touch surface, the subsequent relative movement of said pointers along said touch surface and the pointer types; and
generate an event based on the subsequent relative movement of said pointers along said touch surface and the pointer types.

13. The interactive input system of claim 12 wherein said processing structure generates said event when said pointers are moved along said touch surface away from one another.

14. The interactive input system of claim 13 wherein the event is a graphical object manipulation command.

15. The interactive input system of claim 12 wherein said processing structure generates said event when said pointers are moved along said touch surface towards one another.

16. An event generation method comprising:
detecting multiple pointers brought into contact with a touch surface, the relative positions of the pointer contacts, the subsequent relative movement of said pointers along said touch surface and the pointer types by processing images captured using imaging devices that are proximate to the touch surface and aimed to look generally across the touch surface to determine if a gesture has been input; and
generating an event when an input gesture is determined.

17. The method of claim 16 wherein during said detecting, the subsequent relative movement of said pointers is examined to determine if said pointers are moving towards one another.

18. The method of claim 16 wherein during said detecting, the subsequent relative movement of said pointers is examined to determine if said pointers are moving away from one another.

19. The method of claim 16 wherein during said detecting, the subsequent relative movement of said pointers is examined to determine if one pointer is moving in a generally arcuate path about another pointer.

20. The method of claim 16 wherein during said detecting, the subsequent relative movement of said pointers is examined to determine if said pointers are moving in a generally similar direction.

21. The method of claim 16 wherein said event is a graphical object manipulation command.

22. The method of claim 21 wherein said graphical object manipulation command is one of a graphical object resize command, a graphical object rotate command and a graphical object translate command.

23. The method of claim 21 further comprising executing said graphical object manipulation command.

24. The method of claim 23 wherein during said detecting, the subsequent relative movement of said pointers is examined to determine if said pointers are moving towards one another.

25. The method of claim 23 wherein during said detecting, the subsequent relative movement of said pointers is examined to determine if said pointers are moving away from one another.

26. The method of claim 23 wherein during said detecting, the subsequent relative movement of said pointers is examined to determine if one pointer is moving in a generally arcuate path about another pointer.

27. The method of claim 23 wherein during said detecting, the subsequent relative movement of said pointers is examined to determine if said pointers are moving in a generally similar direction.

28. An event generation method comprising:
capturing images of a touch surface from different vantages using imaging devices;
processing the captured images to detect multiple pointers brought into contact with said touch surface and to recognize a gesture based on the pointer contact positions, the subsequent relative movement of the pointers along said touch surface and the pointer types; and
generating an event when a gesture is recognized.

29. The method of claim 28 wherein during said processing, the captured images are processed to detect movement of multiple pointers towards one another.

30. The method of claim 28 wherein during said processing, the captured images are processed to detect movement of multiple pointers away from one another.

31. The method of claim 28 wherein during said processing, the captured images are processed to detect movement of one pointer in a generally arcuate path about another pointer.

32. The method of claim 28 wherein said event represents a graphical object manipulation command.

33. The method of claim 32 wherein said graphical object manipulation command is one of a graphical object resize command, a graphical object rotate command and a graphical object translate command.

34. The method of claim 33 wherein during said processing, captured the images are processed to detect movement of multiple pointers towards one another.

35. The method of claim 33 wherein during said processing, the captured images are processed to detect movement of multiple pointers away from one another.

36. The method of claim 33 wherein during said processing, the captured images are processed to detect movement of one pointer in a generally arcuate path about another pointer.

37. The method of claim 32 further comprising executing said graphical object manipulation command.

* * * * *